(12) United States Patent
Di Ronza et al.

(10) Patent No.: US 10,301,458 B2
(45) Date of Patent: May 28, 2019

(54) RUBBER COMPOUND TO PRODUCE TYRES

(71) Applicant: BRIDGESTONE CORPORATION, Tokyo (JP)

(72) Inventors: Raffaele Di Ronza, Rome (IT); Ludovica Caliano, Pomezia (IT)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 65 days.

(21) Appl. No.: 15/527,037

(22) PCT Filed: Nov. 17, 2015

(86) PCT No.: PCT/IB2015/058897
§ 371 (c)(1),
(2) Date: May 16, 2017

(87) PCT Pub. No.: WO2016/079678
PCT Pub. Date: May 26, 2016

(65) Prior Publication Data
US 2017/0335093 A1    Nov. 23, 2017

(30) Foreign Application Priority Data
Nov. 17, 2014   (IT) .............................. RM2014A0674

(51) Int. Cl.
*C08L 9/06*  (2006.01)
*C08K 5/098*  (2006.01)

(52) U.S. Cl.
CPC ................ *C08L 9/06* (2013.01); *C08K 5/098* (2013.01)

(58) Field of Classification Search
CPC .......................................................... C08L 9/06
USPC .......................................................... 524/526
See application file for complete search history.

(56) References Cited

U.S. PATENT DOCUMENTS

| | | |
|---|---|---|
| 3,904,591 A | 9/1975 | Fischer |
| 4,165,426 A | 8/1979 | Paul, III |
| 6,307,080 B1 | 10/2001 | Pischel et al. |
| 2008/0299062 A1 | 12/2008 | Kripp et al. |
| 2010/0317795 A1 | 12/2010 | Araujo da Silva et al. |

OTHER PUBLICATIONS

International Search Report of PCT/IB2015/058897 dated Mar. 9, 2016 [PCT/ISA/210].
Written Opinion of PCT/IB2015/058897 dated Mar. 9, 2016 [PCT/ISA/237].

*Primary Examiner* — Deve E Valdez
(74) *Attorney, Agent, or Firm* — Sughrue Mion, PLLC

(57) ABSTRACT

A rubber compound comprising a polymer base with a cross-linkable unsaturated chain, a filler and a vulcanization system. The vulcanization system comprises at least sulphur, one or more vulcanization accelerators, and one or more vulcanization activators. The vulcanization system comprises, as a vulcanization activator, a zinc salt of a monocarboxylic acid with general formula (I)

$$HO_2C(CH_2)_mCO(CH_2)_nCH_3 \qquad (I)$$

wherein:
m is an integer from 0 to 3;
n is an integer from 0 to 4.

8 Claims, No Drawings

RUBBER COMPOUND TO PRODUCE TYRES

CROSS REFERENCE TO RELATED APPLICATIONS

This application is a National Stage of International Application No. PCT/IB2015/058897, filed Nov. 17, 2015, claiming priority based on Italian Patent Application No. RM2014A000674, filed Nov. 17, 2014, the contents of all of which are incorporated herein by reference in their entirety.

TECHNICAL FIELD

The present invention concerns a rubber compound for tyres.

BACKGROUND ART

Recently, one of the main research areas in the field of tyres concerns a possible substitution of zinc oxide (ZnO) as the vulcanization activator.

Due to its possible environmental implications, there is a requirement for the use of ZnO to be limited. Obviously, an excessive limitation of the ZnO, although on the one hand it would meet the environmental requirements, on the other may compromise the vulcanization of the compound with negative consequences in terms of physical and/or dynamic characteristics of the resulting compounds.

The need was therefore felt for an alternative to the use of ZnO in rubber compounds, which meets the environmental requirements without altering the vulcanization of the resulting compound and, consequently, compromising its physical and/or dynamic characteristics.

The Applicant has unexpectedly found that a particular class of zinc salts is able to fully substitute the presence in the compound of the ZnO as the vulcanization activator and, at the same time, maintain unchanged the rheometric and mechanical characteristics of the resulting compound and significantly reduce the overall quantity of zinc in the compound.

In particular, the Applicant has surprisingly found that a class of Zn salts, originally tested as processability adjuvants, have unexpected properties as vulcanization activators. It has been ascertained that the activity of these Zn salts as vulcanization activators is such as to permit complete substitution of the ZnO.

DISCLOSURE OF INVENTION

The subject of the present invention is a rubber compound comprising a polymer base with cross-linkable unsaturated chain, a filler and a vulcanization system; said vulcanization system comprising at least sulphur, one or more vulcanization accelerators and one or more vulcanization activators; said compound being characterised in that said vulcanization system comprises as vulcanization activator a zinc salt of a monocarboxylic acid with general formula (I)

$$HO_2C(CH_2)_mCO(CH_2)_nCH_3 \qquad (I)$$

wherein:
m is an integer from 0 to 3;
n is an integer from 0 to 4.

Here and below, the term "polymer base with cross-linkable unsaturated chain" means any natural or synthetic non cross-linked polymer able to assume all the chemical-physical and mechanical characteristics typically assumed by the elastomers following cross-linking (vulcanization) with sulphur-based systems.

Preferably, said Zn salt of monocarboxylic acid is the only vulcanization activator comprised in said vulcanization system.

Preferably, said Zn salt of monocarboxylic acid represents the only source of Zn in the compound.

Preferably, said Zn salt of monocarboxylic acid is present in the compound in a quantity ranging from 1 to 8 phr; more preferably from 3 to 5 phr.

Preferably, said monocarboxylic acid of said Zn salt is comprised in the group composed of levulinic acid, pyruvic acid and acetoacetic acid.

A further subject of the present invention is a tyre portion produced with the compound subject of the present invention.

A further subject of the present invention is a tyre comprising a portion produced with a compound subject of the present invention.

A further subject of the invention is the use of a Zn salt of monocarboxylic acid according to the invention as a vulcanization activator in rubber compounds.

BEST MODE FOR CARRYING OUT THE INVENTION

Some purely illustrative non-limiting examples are given below for a better understanding of the present invention.

EXAMPLES

Three comparison compounds (A-C) and two compounds of the invention (D and E) were produced.

The three comparison compounds consist of a first compound (Compound A) which, comprising ZnO as the vulcanization activator, represents a compound of the known art, and two compounds in which, in combination with the ZnO, a Zn salt of a monocarboxylic acid with formula (I) according to the invention is also used in different quantities.

The two compounds of the invention D and E are distinguished from the comparison compounds B and C solely due to the complete absence of ZnO and stearic acid among their ingredients.

The compounds of the examples were obtained according to the procedure described below:
—Preparation of the Compounds—
(1st Mixing Step)

The cross-linkable polymer base, the silica, the silane binder and, when scheduled, the Zn salt of a monocarboxylic acid with general formula (I) were loaded, before beginning the mixing, in a mixer with tangential rotors and internal volume between 230 and 270 liters, reaching a filling factor of 66-72%.

The mixer was operated at a speed of 40-60 r.p.m. and the mixture that formed was discharged once a temperature of 140-160° C. had been reached.
(2nd Mixing Step)

The mixture obtained from the preceding step was re-processed in the mixer operated at a speed of 40-60 r.p.m. and, subsequently, discharged once a temperature of 130-150° C. had been reached.
(Final Mixing Step)

The sulphur, the vulcanization agents and, when scheduled, stearic acid and ZnO were added to the mixture obtained from the preceding step, reaching a filling factor of 63-67%. The mixer was operated at a speed of 20-40 r.p.m.

and the mixture that formed was discharged once a temperature of 100-110° C. had been reached.

Table I shows the compositions in phr of the five compounds.

TABLE I

|  | A | B | C | D | E |
|---|---|---|---|---|---|
| S-SBR |  |  | 70 |  |  |
| BR |  |  | 30 |  |  |
| Silica |  |  | 80 |  |  |
| Silane binding agent |  |  | 8 |  |  |
| Stearic acid | 1 | 1 | 1 | — | — |
| ZnO | 2.5 | 2.5 | 2.5 | — | — |
| Zn levulinate | — | 3 | 6 | 3 | 6 |
| Sulphur |  |  | 1.5 |  |  |
| MBTS |  |  | 2 |  |  |
| DPG |  |  | 1.4 |  |  |

S-SBR is a styrene-butadiene synthetic rubber in solution with a mean molecular weight ranging from 800 to 1500×$10^3$ and from 500 to 900×$10^3$ respectively; a styrene content ranging from 10 to 45%, a vinyl content ranging from 20 to 70% and an oil content ranging from 0 to 30%.

BR is a synthetic rubber consisting of polybutadiene.

The silica used is marketed under the name Ultrasil VN3 GR by the company EVONIK and has a surface area of approximately 180 $m^2/g$.

The silane binder used belongs to the class of the polysulphide organosilanes and is marketed under the name SI75 by the company EVONIK.

MBTS is the acronym of the accelerating compound mercaptobenzothiazole disulphide;

DPG is the acronym of the accelerating compound diphenylguanidine.

From the mixtures of Table I, respective samples were produced which underwent a series of tests to evaluate their rheometric, mechanical and dynamic mechanical properties.

In particular, the rheometric properties were measured according to the ASTM D6204 standard; the mechanical properties were measured according to the ASTM D412C standard; the dynamic mechanical properties were measured according to the ISO 4664 standard.

To more immediately highlight the advantages of the compounds of the present invention, the values obtained from the tests were reported in Table II as indexed with respect to the results obtained from the comparison compound A.

TABLE II

|  | A | B | C | D | E |
|---|---|---|---|---|---|
| ML | 100 | 95 | 95 | 95 | 95 |
| MH | 100 | 105 | 110 | 100 | 98 |
| t50 | 100 | 90 | 80 | 100 | 100 |
| t90 | 100 | 86 | 80 | 100 | 100 |
| M300 | 100 | 130 | 140 | 99 | 100 |
| EB | 100 | 90 | 80 | 100 | 100 |
| TB | 100 | 120 | 130 | 100 | 99 |
| E' 30° C. | 100 | 130 | 140 | 100 | 100 |
| TAND60° C. | 100 | 100 | 100 | 100 | 100 |

The surprising activity of the Zn salts as vulcanization activators according to the invention is evident from the values of Table II. In this regard it should be noted that the values of t50 and t90 decrease drastically once the Zn levulinate is used together with the ZnO (Compounds B and C). Such a vulcanization speed necessarily reflects on the mechanical characteristics of the compound, compromising the use thereof.

The results relative to the compounds D and E of Table II show that use of the sole Zn salt according to the invention allows restoration of the mechanical and rheometric characteristics of the compound A, simultaneously improving the processability thereof.

It has further been calculated that use of the Zn salt according to the invention allows a drastic reduction of the Zn in the compound. For example, the compounds D and E entail with respect to the compound A a reduction in the quantity of Zn of 66% and 31% respectively.

In other words, the Zn salts according to the invention have shown that they possess properties in terms of vulcanization activation such as to allow complete substitution of the ZnO without altering the mechanical and rheometric characteristics of the compounds.

Further advantages relative to substitution of the ZnO with the salts of Zn according to the invention are improved processability, the possibility of not using stearic acid, the lower quantity of Zn present in the compound and, above all, the fact that many of the monocarboxylic acids of the Zn salts of the present invention can be derived from second generation biomasses, i.e. not in competition with the food chain.

The invention claimed is:

1. A rubber compound comprising a polymer base with a cross-linkable unsaturated chain, a filler, and a vulcanization system; said vulcanization system comprising at least sulphur, one or more vulcanization accelerators, and one or more vulcanization activators; said compound being characterized in that said vulcanization system comprises, as a vulcanization activator, a zinc salt of a monocarboxylic acid with general formula (I)

$$HO_2C(CH_2)_mCO(CH_2)_nCH_3 \quad (I)$$

wherein:
m is an integer from 0 to 3;
n is an integer from 0 to 4.

2. A rubber compound according to claim 1, characterized in that said Zn salt of a monocarboxylic acid with general formula (I) is the only vulcanization activator comprised in said vulcanization system.

3. A rubber compound according to claim 1, characterized in that said Zn salt of a monocarboxylic acid with general formula (I) is the only source of Zn in the compound.

4. A compound according to claim 1, characterized in that said Zn salt of a monocarboxylic acid with general formula (I) is present in the compound in a quantity ranging from 1 to 8 phr.

5. A compound according to claim 1, characterized in that said Zn salt of a monocarboxylic acid with general formula (I) is present in the compound in a quantity ranging from 3 to 5 phr.

6. A compound according to claim 1, characterized in that said monocarboxylic acid with general formula (I) is comprised in the group consisting of levulinic acid, pyruvic acid, and acetoacetic acid.

7. A tyre portion manufactured with a compound according to claim 1.

8. A tyre comprising a portion according to claim 7.

* * * * *